(12) United States Patent
Sesselmann

(10) Patent No.: US 7,354,370 B2
(45) Date of Patent: Apr. 8, 2008

(54) DRIVE SYSTEM FOR REGULATING DEVICES IN MOTOR VEHICLES

(75) Inventor: Helmut Sesselmann, Steinach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 154 days.

(21) Appl. No.: 10/568,738

(22) PCT Filed: Aug. 21, 2004

(86) PCT No.: PCT/DE2004/001889

§ 371 (c)(1),
(2), (4) Date: Feb. 17, 2006

(87) PCT Pub. No.: WO2005/021915

PCT Pub. Date: Mar. 10, 2005

(65) Prior Publication Data

US 2006/0205559 A1    Sep. 14, 2006

(30) Foreign Application Priority Data

Aug. 21, 2003    (DE) ............................ 203 13 273 U

(51) Int. Cl.
*F16H 48/06*    (2006.01)

(52) U.S. Cl. .................. 475/149; 49/352; 310/75 R; 254/344

(58) Field of Classification Search .............. 475/149; 49/352; 310/75 R, 67 R; 254/344, 362
See application file for complete search history.

(56) References Cited

U.S. PATENT DOCUMENTS

| | | | |
|---|---|---|---|
| 4,821,589 A * | 4/1989 | Fukumoto et al. | ......... 74/89.22 |
| 4,899,608 A | 2/1990 | Knappe et al. | |
| 5,095,766 A * | 3/1992 | Knappe et al. | ............ 74/89.22 |
| 7,276,009 B2 * | 10/2007 | Bornchen et al. | ........... 475/149 |

| | | | |
|---|---|---|---|
| 2002/0135241 A1 | 9/2002 | Kobayashi et al. | |
| 2004/0100155 A1* | 5/2004 | Sesselmann et al. | ...... 310/75 R |

* cited by examiner

FOREIGN PATENT DOCUMENTS

| | | |
|---|---|---|
| DE | 268 510 A1 | 5/1989 |
| DE | 197 08 310 A1 | 9/1998 |
| DE | 298 16 635 U1 | 1/1999 |
| DE | 199 43 021 C1 | 6/2001 |
| EP | 0 261 525 A1 | 3/1988 |
| WO | WO 01/89063 A1 | 11/2001 |

OTHER PUBLICATIONS

English translation of International Preliminary Examination Report for corresponding PCT application No. PCT/DE2004/001889, dated Jul. 10, 2006.
International Search Report, dated Jan. 27, 2005, corresponding to PCT/DE2004/001889.

*Primary Examiner*—Ha D. Ho
(74) *Attorney, Agent, or Firm*—Christie, Parker & Hale, LLP.

(57) ABSTRACT

A drive system for regulating devices in motor vehicles comprising a housing containing a drive element of the regulating device, a disk armature motor provided with an armature disk, and a planet wheel transmission. The planet wheel transmission comprises an internal geared wheel fixed to the housing and provided with an internal gear, an output internal geared wheel connected to the drive element of the regulating device and provided with an internal gear, and a radially flexible ring, the external gear thereof partially meshing with the inner gears of the internal geared wheel fixed to the housing and of the output internal geared wheel, and the inner envelope surface thereof rolling on rollers arranged on a drive hub connected to the armature disk. A journal pertaining to the output internal geared wheel is centred between the fixed drive axle and a cylinder of the drive hub.

35 Claims, 3 Drawing Sheets

DRIVE SYSTEM FOR REGULATING DEVICES IN MOTOR VEHICLES

CROSS-REFERENCE TO A RELATED APPLICATION

This application is a National Phase Patent Application of International Application Number PCT/DE2004/001889, filed on Aug. 21, 2004, which claims priority of German Utility Model Number 203 13 273.4, filed on Aug. 21, 2003.

BACKGROUND

The invention relates to a drive system for regulating devices in motor vehicles. From an International Patent Application No. WO 01/89063 A1 a drive unit is known for regulating devices in motor vehicles having the features of the preamble of claim 1. Since with this known drive unit at least one component part of the disc armature motor such as for example the drive shaft, the magnetic short circuit or the housing shell on the motor side also undertakes an additional mechanical function of the planet wheel transmission and/or a mechanical component part such as the housing shell on the gearing side undertakes a function of the disc armature motor the drive unit is as a result of the multiple use of individual component parts characterised by a minimum number of parts and minimum weight as well as following the interfitting box structure and thus the high degree of integration of the component parts of the drive unit by a small volume and more particularly by its flat method of construction.

As opposed to the drive units normally used comprising rod armature motors with worm gearing as reduction gearing which through their type of construction are not equally suited to right and left hand vehicle doors where the structural height in the door region is an interference and whose installation position is not flexible particularly through rotation of the drive unit, wherein the centre of gravity of the motor lies outside of the screw connection of the drive unit and whose system mass is very high, the drive unit according to the International Patent Application No. WO 01/89063 A1 is particularly suitable for installation in vehicle doors as a result of its properties previously mentioned since it can be incorporated without problem in a base part, door module or a support plate in any angular position and independently of which door side and provides a single assembly plane and thus a variable use.

A further reduction in the structural volume of the drive unit known from the International Patent Application No. WO 01/89063A1 comes up against stability limits if the material thickness of the component parts of the drive unit used is reduced and the distances between the component parts which are already boxed in each other with a high degree of integration are reduced. Thus the small air gap between the armature disc and the permanent magnet of the stator of the disc armature motor in the case of a stable mounted armature disc which is not permanently precisely aligned would lead to contact between the armature disc and permanent magnets and thus to premature wear and breakdown of the drive unit. Furthermore the mechanical stability of the planet wheel transmission would be endangered if the centring of the mechanical component parts is not permanently guaranteed and also under severe strain no deformations of the gearing parts occur.

The object of the present invention is therefore to provide a drive system for regulating devices in motor vehicles of the type mentioned at the beginning which ensures a further reduction in the structural volume and more particularly an extremely flat method of construction without impairing the functioning, mechanical stability and durability of the drive unit.

BRIEF DESCRIPTION

The solution according to the invention enables the production of a drive system for regulating devices in motor vehicles with minimum structural volume and more particularly an extremely flat drive system without having to take into consideration deterioration in the functioning, mechanical stability and durability of the drive system.

Thus the drive system according to the invention with its low structural height, reduced weight and reduced costs achieved through material savings and multi-functioning of the component parts used is particularly suitable for electromotorised regulating devices in motor vehicles where the installation volume available is small and where when installed in motor vehicle doors or in roof structures a minimum structural height and variable usability is required.

The solution according to the invention is based on the knowledge that an exact bearing as well as axial guidance and alignment of the component parts of the drive system is of elementary importance for the mechanical stability of the drive system and a reduction in the distances between the component parts as well as a reduction in the weight and thickness thereof. By fitting the fixed drive axle, journal of the output internal geared wheel and drive hub cylinder of the drive hub onto each other as a result of the length of the bearing which can be achieved despite the compressed construction an accurate and permanent guidance and alignment of the armature disc as well as of the journal of the slow running output internal geared wheel is achieved which is thus securely mounted and guided on the entire length of the fixed drive axle in order to avoid tumbling movements.

The length of the drive hub cylinder preferably corresponds substantially to the height of the rollers so that for guiding and aligning the armature disc the entire length or structural depth of this part of the planet wheel transmission is used which is required in any case for attaching and guiding the radially flexible ring which meshes both with the internal gearing of the hollow wheel fixed on the housing and also with the internal gearing of the output hollow wheel.

In order to secure the position and alignment of the fixed drive axle this is connected to a first housing cover of the housing surrounding the drive element of the regulating device, the armature disc motor and the planet wheel transmission, and is supported on a second housing cover of the housing.

By selecting matching materials in the region of the bearing point between the fixed drive axle, journal of the output internal geared wheel and drive hub cylinder of the drive hub whereby the fixed drive axle and the drive hub cylinder are made of steel or a steel alloy and the journal is made of sintered metal, optimum bearing properties are achieved. It is thereby further possible to use the high-grade and comparatively expensive sintered metal bearing material only once and thereby to produce both an optimum bearing for the fixed drive axle and for the fast-turning drive hub.

A further important measure for reducing the volume and more particularly structural depth of the drive system lies in connecting the hollow wheel fixed on the housing to a base disc or to make it part of a base disc which supports the permanent magnets of the disc armature motor and has centring means provided around the periphery to centre at least one of the two housing covers relative to the base disc.

The base disc centres as a central positioning element at least the one but preferably both housing covers of the housing and at the same time supports the hollow wheel gearing which is either formed integral on the base disc or is connected to the base disc in a two-part variation as plastics or metal parts in the twin-component system so that the base disc without any increase in the structural depth of the drive system fulfils a double function as gearing element and as centring element for the precision alignment and bearing of the component parts of the drive system.

In order to increase the mechanical stability of the base disc this can be provided with a cropped peripheral edge as well as for positioning and securing the position of the permanent magnets with profiling.

Furthermore the base disc can be connected to a disc, preferably of plastics, supporting the permanent magnets through stamped areas and/or cropped bracket plates which are stamped or bent out from the base disc.

Socket areas can also be incorporated into the outwardly directed edge of the hollow wheel fixed on the housing and are adapted at least in sections to the contour of the permanent magnets of the disc armature motor so that the permanent magnets can be readily positioned there.

More particularly the socket areas can be formed in the outwardly directed edge of the hollow wheel fixed on the housing as radially outwardly opening sockets.

The base disc preferably consists of plastics in which socket areas are incorporated which are adapted at least in sections to the contour of the permanent magnets of the disc armature motor.

The socket areas of the hollow wheel fixed on the housing of the base disc surround the permanent magnets so far that a defined position of the permanent magnets is secured.

Determining the position of the permanent magnets is formed at the same time through the hollow wheel which is fixed on the housing and made from plastics or a paramagnetic material for simplifying assembly. Fixing the permanent magnets is carried out by shaping the internal wheeled gearing or through fixing elements for subsequent positive locking or force locking connection of the base disc to the permanent magnets which are incorporated in the plastics.

The permanent magnets themselves are more particularly made by injection moulding process from plastics-bonded high-energy materials with their possibilities for shaping plastics parts. Flatness and tolerances are ensured through the tool to a high extent so that the base disc can be used in connection with the plastics-bonded magnet system without parasitic magnetic losses as short-circuit. Sticking and fixing the permanent magnets is thereby unnecessary because the magnet material and base disc can be connected to each other with undercut sections.

In order to be able to save mass the ferrite metal parts can be thickened by tailored blanks only in the region of the flux-conveying short circuits.

Likewise to increase the stability of a very thin drive hub this can have several cropped angles formed out of its surface and aligned towards the side of the rollers and thus use space which is available in any case thereby not causing any increase in the structural depth. The requirement is thereby met that the pair of rollers preferably mounted on sliding or rolling bearings can be placed asymmetrically, leading to a further reduction in the structural height.

In order to simplify the manufacture and material saving the drive hub cylinder and/or the roller bearings can be formed as passages in the drive hub and the outer cylinder face of the passages can be supported by hardened steel bushes with collar.

For a better guidance of the radially flexible ring the rollers are preferably provided with grooves.

In order to absorb force peaks when the regulating device moves into an end position such as for example the upper and lower stops of a window lifter, circumferentially active damping elements are integrated in the output internal geared wheel of the drive system. The damping is thereby shifted in the drive system radially further out in to the region of the connection and the drive system can be fixed by way of example in a door module by a bayonet connection.

As an alternative or in addition the output internal geared wheel can be connected to a loop spring brake whereby the self locking action of the drive system is increased and by way of example in the case of a window lifter unauthorised access to inside the vehicle by forcing down the window pane is thereby prevented.

A steel ring can optionally be provided in the output internal geared wheel to support the radial forces which act on the output internal geared wheel. This steel ring can additionally undertake the function of the brake ring for the installation of the loop spring.

Furthermore a sintered metal/plastics connection can be provided in the output internal geared wheel.

The drive element of the regulating device, for example a cable drum of a window lifter, can either be connected in the axial direction to the output internal geared wheel and be axially fixed through holding clips integrated in the second housing cover or the output internal geared wheel is integrated or moulded into the drive element of the regulating device.

The first alternative provides a service solution where in the event of breakdown or wear the cable drum can be easily exchanged without replacing the motor/gearing unit whilst with the second alternative the enhanced integration produces an ultra-flat structural form of the drive system with integrated drive element of the regulating device.

BRIEF DESCRIPTION OF THE DRAWINGS

The invention and the idea on which the invention is based will now be explained in further detail with reference to the embodiments illustrated in FIGS. 1 to 3 of the drawings.

DETAILED DESCRIPTION

Figure 1:
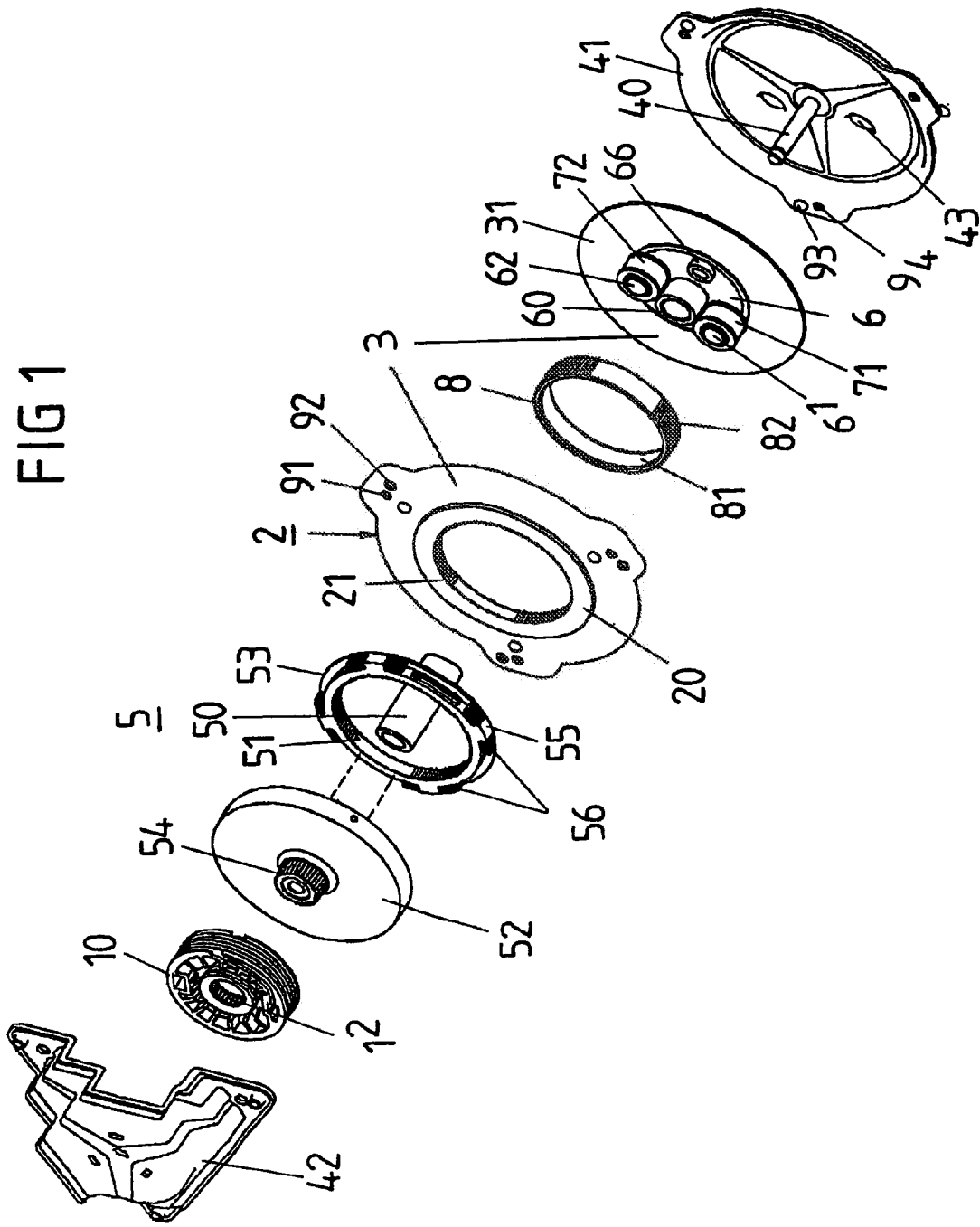
FIG. 1 is a perspective exploded view of the structural and functional parts of an ultra-flat drive system according to the invention for a cable window lifter.
Figure 2:
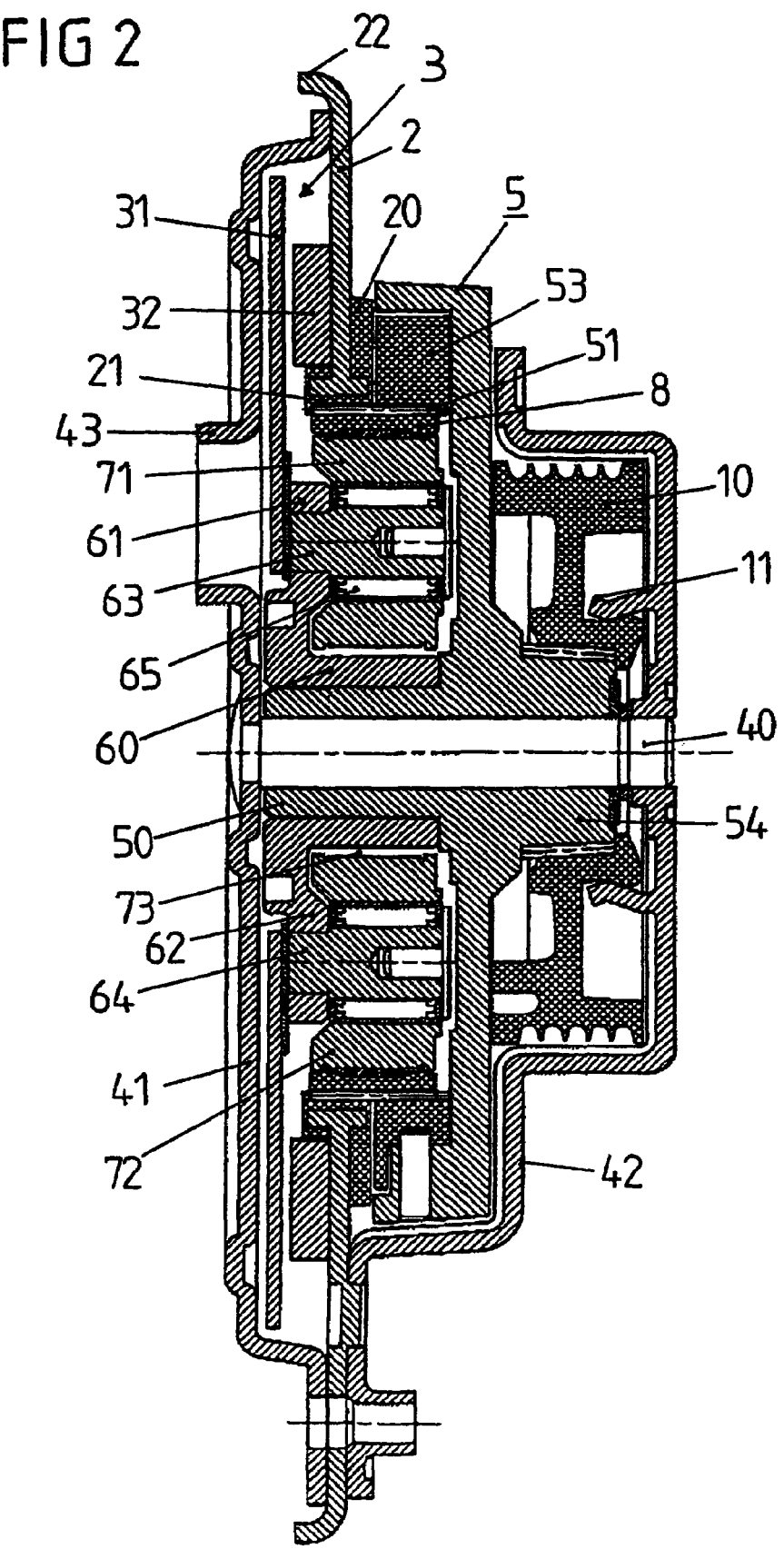
FIG. 2 is a longitudinal sectional view through the drive system according to FIG. 1.

FIG. 1 shows an exploded view of a drive system illustrated in longitudinal sectional view in FIG. 2 for a cable window lifter of a motor vehicle. The drive system comprises a disc armature motor 3, a planet wheel transmission 5, 6, 21, 71, 72 and a cable drum 10 which are mounted in a housing which comprises two housing covers 41, 42 and is centred on a base disc 2.

The electronically commutated disc armature motor 3 in this embodiment comprises an armature disc 31 and several permanent magnets 32 arranged spaced out round the circumference of the base disc 2 (FIG. 2). The armature disc 31 is connected to a drive hub 6 which is preferably formed as a stamped steel part and has a passage formed as a drive hub cylinder 60 as well as two passages 61, 62 for two roller bearings 63, 64 on which two rollers 71, 72 of the planet wheel transmission are mounted and supported through rolling bearings 65 opposite the rollers 71, 72. Furthermore several cropped angles 66 are provided on the drive hub 6 for increasing the stability of the drive hub 6.

As an alternative to the drive hub 6 designed as a stamped steel part the drive hub 6 can be made from sintered metal or high-grade glass-fibre or carbon-fibre reinforced plastics or combinations of these materials. The outer cylindrical face of the passages for the drive hub cylinder 60 and for the roller bearings 61, 62 are more particularly supported through hardened steel bushes with collar. The drive hub cylinder 60 has a length which corresponds roughly to the height of the rollers 71, 72 so that a maximum guide length is guaranteed for the drive hub cylinder 60.

The planet wheel gearing is comprised of a hollow wheel 20 fixed on the housing and having internal toothing 21 with a first number of teeth, an output hollow wheel 5 with internal toothing 51 with a second number of teeth and a radially flexible ring 8 on the inner sleeve face 81 of which the rollers 71, 72 roll and whose external toothing 82 meshes both the internal toothing 21 of the hollow wheel 20 fixed on the housing and with the internal toothing 51 of the output wheel 5. The radially flexible 8 is guided for axial security in peripheral grooves 73 of the rollers 71, 72.

The hollow wheel 20 which is fixed on the housing is connected to the base disc 2 or is formed as a part of the base disc 2. The base disc 2 serves in addition to securing the position of the permanent magnets 32 of the disc armature motor 3 also as a central positioning element for centring the two housing covers 41, 42 and has for this purpose centring elements 91, 92 which are designed as studs and indentations and which correspond with the corresponding counter centring elements 93, 94 of the first housing cover 41. The base disc 2 forms together with the first housing cover 41 at the same time the magnetic short circuit for the disc armature motor 3.

The first housing cover 41 has to increase its stability additional cropped angles as well as the swages and indentations whilst the second housing cover 42 is aligned and fixed on a flange formed on the base disc 2 or on a corresponding centring recess or centring groove.

The base disc 2 is formed as a flat ring with a peripheral cropped angle 22 and can be connected through indentations and/or cropped bracket plates to a disc preferably of plastics which has sockets for the permanent magnets 31 of the disc armature motor 3.

The internal toothing 21 of the hollow wheel 20 fixed on the housing can either be formed in a metal edge of the base disc 2 or can be connected in a two-part variation to a hollow wheel toothing of plastics or a metal component in the twin component system. In this embodiment with for example a plastics hollow wheel this part of the base disc 2 has open or closed socket bays for the permanent magnets 32 and the circumferential forces acting on the plastics hollow wheel are transferred through force locking connection with the cropped edge 22 of the base disc 2 where applicable additionally through the bracket plates which are bent and stamped out on alternate sides.

The output hollow wheel 5 is formed in two parts in the embodiment illustrated in FIG. 2 and is comprised of an output drum 52 preferably of steel and a plastics ring 53 supporting the internal toothing 51. On the periphery of the plastics ring 53 there are two dampers 56 on each side of the peripheral webs 55 to correspond with stops 57 arranged in the circumferential direction on the cylindrical edge of the output drum 52 and forming damping members to absorb force peaks which result from the window lifter moving into the end positions.

The output hollow wheel 5 is connected to a journal 50 which extends over an essential part of the length of a fixed drive axle 40 which connects the two housing covers 41, 42 together, is pushed onto the fixed drive axle 40 and supports the drive hub cylinder 60 so that the journal 50 is mounted between the fixed drive axle 40 and the drive hub cylinder 60. The material pairing in the region of the bearing points between the fixed drive axle 40, the bearing journal 50 and the drive hub cylinder 60 is thus selected so that optimum bearing properties are achieved. More particularly the journal is made from a sintered metal whilst the fixed drive axle 40 and the drive hub cylinder 60 are made from steel. It is thereby possible to insert the higher-grade and more cost-intensive sintered metal bearing material between the two layers of steel and to have to use this only once so that an optimum bearing is produced both for the fixed drive axle 40 and for the fast-turning drive hub cylinder 60.

The bearing of the journal 50 over practically the entire length of the fixed drive axle 40 ensures the centring of the output hollow wheel 2 so that no tumbler movements and subsequent noises occur and at the same time it forms a long axial bearing for the drive hub cylinder 60 so that the armature disc 31 which is mounted with slight axial play relative to the base disc 2 and first housing cover 41 is likewise securely supported whilst maintaining a minimum air gap in respect of the housing cover 41 and the base disc 2.

The journal 50 has a pinion gearing 54 which engages through an opening in the output drum 52 and serves to receive internal toothing 12 of the cable drum 10. The cable drum 10 is connected through holding clips 22 to the second housing cover 42. This produces a cost-effective service solution since in the event of wear the cable drum 10 can be removed from the drive system after removing the second housing cover 42 and then replaced.

Figure 3:
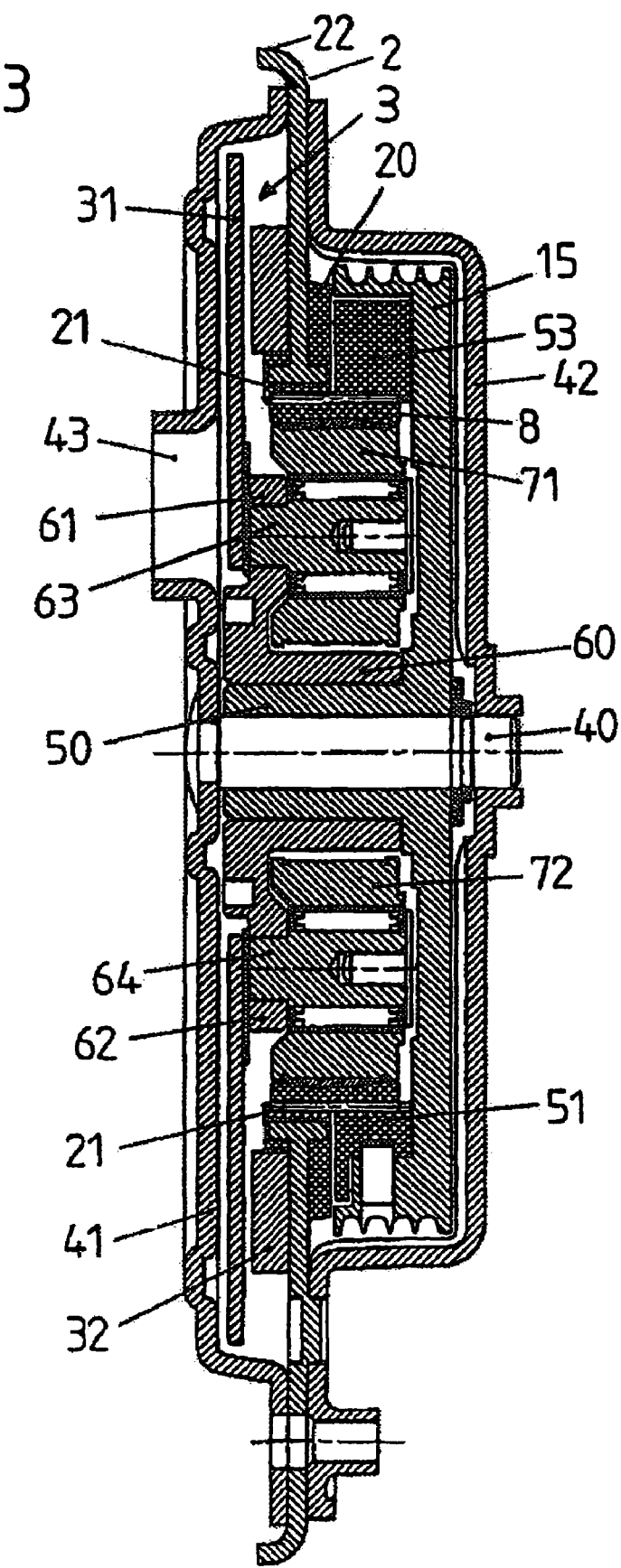
FIG. 3 is a longitudinal sectional view through a drive system for a cable window lifter with a cable drum integrated in the output internal geared wheel.

Whereas the drive system illustrated in FIGS. 1 and 2 has nevertheless an overall thickness of for example about 35 mm despite a high degree of integration and the inter-boxed structural elements taking into account a high strength and durability as a result of the cable drum 10 fitted on the output internal geared wheel 5, the drive system illustrated in longitudinal section in FIG. 3 is designed ultra-flat by optimizing all the possibilities for multiplexing and multi-use of component parts of the drive system whilst ensuring exact guidance of the rotating component parts.

The construction and function of the ultra flat drive system illustrated in FIG. 3 corresponds as regards the housing, the disc armature motor and planet wheel transmission to the drive system according to FIG. 2 with the measure that in this embodiment the cable drum 15 is integrated into the output internal geared wheel 5, i.e. the cable drum 15 forms at the same time the output internal geared wheel 5 and supports on its hollow cylindrical edge the internal toothing 51 which meshes with the toothing 82 of the radially flexible ring 8. Through this additional measure the structural depth of the ultra-flat drive system illustrated in FIG. 3 can be reduced to about 20 to 23 mm and is particularly suitable therefore for fitting into vehicle doors or roofs where the system means that only a small structural depth is available.

The drive system illustrated in FIGS. 1 to 3 makes use of the principle of a "harmonic-drive-gearing". According to this principle the toothing 82 of the radially flexible ring 8 meshes both with the internal toothing 21 of the hollow wheel 20 fixed on the housing and with the internal toothing 51 of the output hollow wheel 5 which have a different number of teeth. The rollers 71, 72 which roll on the cylinder sleeve face 81 of the radially flexible ring 8 engage at two opposite points on the radially flexible ring 8 and deform this elliptically. The toothing 82 of the radially flexible ring 8 is thereby pressed into the cylindrical internal toothings 21, 51 and as a result of the different number of teeth of the internal toothings 21, 51 causes a permanent continuous off-setting of the interengaging circumferential sections so that one complete revolution of the drive hub 6 only engenders a further movement of the output hollow wheel 5 by the difference in the number of teeth of the internal toothings 21, 51 of the hollow wheel 20 fixed on the housing and the output hollow wheel 5. A very high reduction can thereby achieved with this planet wheel gearing according to the principle of a harmonic-drive gearing.

The invention claimed is:

1. A drive system for regulating a device in motor vehicles comprising a housing in which a drive element of the regulating device, a disc armature motor with an armature disc and a planet wheel transmission are arranged, the planet wheel transmission having a hollow wheel with internal toothing fixed on the housing, an output internal geared hollow wheel connected to the drive element of the regulating device, and a radially flexible ring whose external toothing meshes partially with the internal toothing of the hollow wheel fixed on the housing and meshes partially with the output wheel, wherein an inner sleeve face of the radially flexible ring rolls on rollers which are mounted on a drive hub connected to the armature disc, wherein a journal of the output internal geared wheel extending over a significant part of the length of a fixed drive axle is centered between the fixed drive axle and a drive hub cylinder of the drive hub.

2. The drive system according to claim 1, wherein a length of the drive hub cylinder corresponds to a height of the rollers.

3. The drive system according to claim 1, wherein the fixed drive axle is connected to a first housing cover of the housing and is supported on a second housing cover of the housing.

4. The drive system according to claim 1, wherein the fixed drive axle and the drive hub cylinder are made from one of steel and a steel alloy and the journal centered between the fixed drive axle and the drive hub cylinder is made from sintered metal.

5. The drive system according to claim 3, wherein the hollow wheel fixed on the housing is connected to a base disc and is formed as a part of the base disc which supports permanent magnets of the disc armature motor and has centering elements which are arranged on the periphery and center at least one of the two housing covers relative to the base disc.

6. The drive system according to claim 5, comprising socket areas in the outwardly aligned edge of the hollow wheel fixed on the housing, wherein the socket areas are adapted at least in sections to a contour of the permanent magnets of the disc armature motor.

7. The drive system according to claim 6, wherein the socket areas are formed in the outwardly directed edge of the hollow wheel fixed on the housing as radially outwardly opening sockets.

8. The drive system according to claim 5, wherein the internal toothing of the hollow wheel fixed on the housing is formed in a metal edge of the base disc.

9. The drive system according to claim 5, wherein centering elements of the base disc correspond to counter centering elements of the first housing cover which support the fixed drive axle.

10. The drive system according to claim 5, wherein the base disc has a cropped peripheral edge.

11. The drive system according to claim 5, wherein the base disc has profiling for positioning and securing a position of the permanent magnets.

12. The drive system according to claim 5, wherein the base disc is connected through any one of stamped indentations and cropped bracket plates to a disc constructed from plastics supporting the permanent magnets.

13. The drive system according to claim 5, wherein the base disc is made of plastics in which socket areas are formed which are adapted at least in sections to a contour of the permanent magnets of the disc armature motor.

14. The drive system according to claim 5, wherein the base disc comprises plastics in which the permanent magnets of the disc armature motor are cast.

15. The drive system according to claim 5, wherein the base disc comprises socket areas made from bracket plates which are stamped out and bent round from the base disc.

16. The drive system according to claim 5, wherein the hollow wheel comprises socket areas and wherein the socket areas of the hollow wheel fixed on one of the housing and of the base disc surround the permanent magnets so far that a defined position of the permanent magnets is ensured.

17. The drive system according to claim 1, wherein ferrite metal parts of the drive system are thickened by tailored blanks only in a region of flux-conveying short circuits.

18. The drive system according to claim 1, wherein the drive hub comprises one of a steel stamped part, a sintered metal, a glass fiber and carbon fiber reinforced plastics.

19. The drive system according to claim 18, wherein the drive hub has several cropped angles formed out from the surface.

20. The drive system according to claim 18, wherein one of the drive hub cylinder and the rollers is designed as passages through the drive hub.

21. The drive system according to claim 20, wherein an outer cylindrical surface of the passages is supported by hardened steel bushes with collar.

22. The drive system according to claim 20, wherein the rollers are mounted and arranged asymmetrically through one of sliding and rolling bearings on the passages and with bearing bolts connected to the passages.

23. The drive system according to claim 1, wherein the rollers have grooves for guiding the radially flexible ring.

24. The drive system according to claim 1, wherein circumferentially active damping elements are integrated in the output hollow wheel.

25. The drive system according to claim 1, wherein the output hollow wheel is connected to a loop spring brake.

26. The drive system according to claim 1, wherein the drive element of the regulating device is connected in the axial direction to the output hollow wheel.

27. The drive system according to claim 26, wherein holding clips are integrated in a second housing cover of the housing for axially fixing the drive element of the regulating device.

28. The drive system according claim 1, wherein any one of damping elements and a loop spring brake is mounted between the output hollow wheel and the drive element.

29. The drive system according to claim 1, wherein the output hollow wheel is integrated in the drive element of the regulating device.

30. The drive system according to claim 1, wherein the output hollow wheel is formed in any one of one piece and in two pieces of plastics.

31. The drive system according to claim 27, wherein a steel ring is mounted in the output hollow wheel to support the radial forces acting on the output hollow wheel.

32. The drive system according to claim 1, wherein the radially flexible ring has a supporting metal ring.

33. The drive system according to claim 1, wherein the radially flexible ring has a loop spring as supporting element.

34. The drive system according to claim 30, wherein the output hollow wheel comprises any one of a metal bearing material and a sintered metal.

35. The drive system according to claim 32, wherein the supporting metal ring comprises any one of steel and steel alloys.

* * * * *